United States Patent
Leung et al.

(10) Patent No.: US 10,063,556 B2
(45) Date of Patent: *Aug. 28, 2018

(54) CONTENT SERVICE ON DEMAND

(71) Applicant: CISCO TECHNOLOGY, INC., San Jose, CA (US)

(72) Inventors: Kent K. Leung, Palo Alto, CA (US); Jayaraman R. Iyer, San Jose, CA (US); Bruce A. Thompson, Saratoga, CA (US); Flemming S. Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,558

(22) Filed: Aug. 4, 2016

(65) Prior Publication Data

US 2017/0034175 A1 Feb. 2, 2017

Related U.S. Application Data

(63) Continuation of application No. 13/842,426, filed on Mar. 15, 2013, now Pat. No. 9,413,748.

(51) Int. Cl.
*H04L 29/06* (2006.01)
*H04L 12/24* (2006.01)

(52) U.S. Cl.
CPC .......... *H04L 63/10* (2013.01); *H04L 41/0896* (2013.01); *H04L 63/0807* (2013.01); *H04L 63/0876* (2013.01)

(58) Field of Classification Search
CPC . H04L 63/10; H04L 41/0896; H04L 63/0876; H04L 63/0807
See application file for complete search history.

(56) References Cited

U.S. PATENT DOCUMENTS

| | | | | | |
|---|---|---|---|---|---|
| 5,442,771 | A | * | 8/1995 | Filepp | C08L 67/025 707/E17.032 |
| 5,610,910 | A | * | 3/1997 | Focsaneanu | H04L 12/2801 370/351 |
| 5,758,258 | A | * | 5/1998 | Shoff | H04N 7/17354 348/E7.075 |
| 5,778,367 | A | * | 7/1998 | Wesinger, Jr. | G06F 17/3089 |
| 5,819,092 | A | * | 10/1998 | Ferguson | G06F 17/30014 705/39 |
| 5,956,489 | A | * | 9/1999 | San Andres | G06F 11/1662 709/221 |
| 8,346,225 | B2 | * | 1/2013 | Raleigh | H04L 41/0806 370/230 |

(Continued)

OTHER PUBLICATIONS

E. Hammer-Lahav, "The OAuth 1.0 Protocol," IETF, RFC 5849, Apr. 2010, 38 pages.

*Primary Examiner* — John B King
(74) *Attorney, Agent, or Firm* — Merchant & Gould P.C.

(57) ABSTRACT

A method is provided and may include receiving a request for a network content delivery service from an access device; directing the access device to a network service provider for authentication for the network content delivery service; receiving a network authorization token from the access device, where the network authorization token is associated with the access device; obtaining a network access token from the network service provider; and binding the network access token to a content access token.

20 Claims, 13 Drawing Sheets

(56) References Cited

U.S. PATENT DOCUMENTS

| | | |
|---|---|---|
| 9,413,748 B2 | 8/2016 | Leung et al. |
| 2003/0005333 A1 | 1/2003 | Naguchi |
| 2003/0084288 A1 | 5/2003 | de Jong |
| 2003/0189900 A1* | 10/2003 | Barany ............... H04L 1/0014 370/229 |
| 2008/0304411 A1* | 12/2008 | Ikada ............... G06F 17/30864 370/232 |
| 2011/0023111 A1 | 1/2011 | Gunadisastra et al. |
| 2011/0107379 A1* | 5/2011 | Lajoie ............... H04L 65/1016 725/87 |
| 2012/0278229 A1 | 11/2012 | Vishwanathan et al. |
| 2012/0284335 A1* | 11/2012 | Chung ............... H04L 63/0414 709/204 |
| 2013/0089033 A1 | 4/2013 | Kahn et al. |
| 2013/0091248 A1 | 4/2013 | Viswanathan et al. |
| 2013/0107741 A1 | 5/2013 | Huang et al. |

* cited by examiner

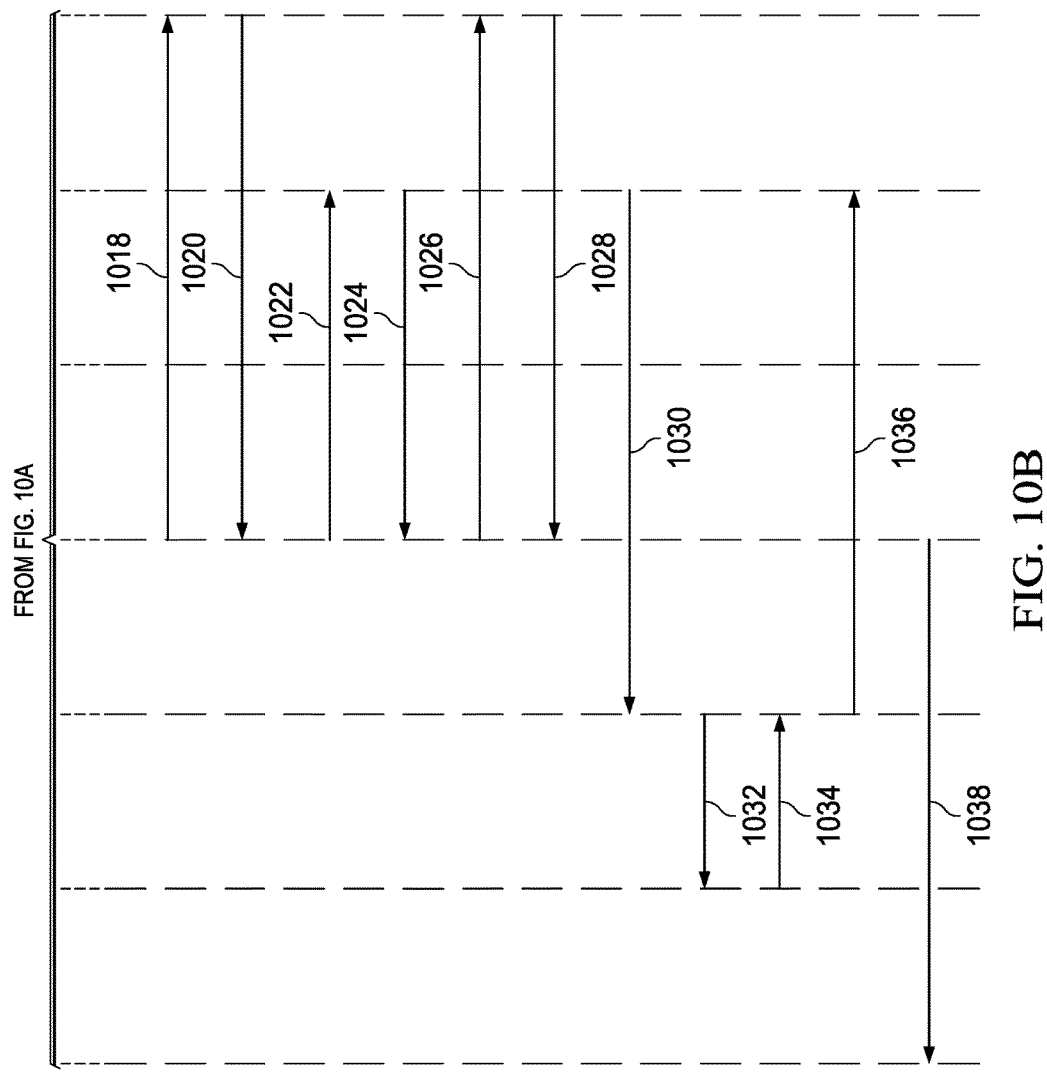

CONTENT SERVICE ON DEMAND

RELATED APPLICATION

This application is a continuation (and claims the benefit of priority under 35 U.S.C. § 120) of U.S. application Ser. No. 13/842,426, filed Mar. 15, 2013, now U.S. Pat. No. 9,413,748 entitled "CONTENT SERVICE ON DEMAND," Inventors Kent K. Leung et al. The disclosure of the prior application is considered part of (and is incorporated by reference in) the disclosure of this application.

TECHNICAL FIELD

This disclosure relates in general to the field of content service on demand and, more particularly, to providing network content with a differentiated quality of service (QoS).

BACKGROUND

There is plenty of Over-The-Top (OTT) high quality video content available on the Internet. The volume and initial consumer adoption is increasing dramatically. Traditional TV content still dominates, and consumers are used to a premium TV experience. The online transition to Over-the-Top content, or more generally, content provided by a content service provider that differs from the network service provider, is enabling the ability to view content anytime anywhere. Content that can be associated with a content provider may be viewed as Over-the-Top content with regard to a network service provider. For example, a subscriber with a cable TV subscription may watch their cloud DVR recordings over a mobile network using a tablet PC. However, currently, the online Over-the-Top experience relies on over-provisioned access networks that may leave a lot to be desired in terms of quality observed by the end user.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 10A and 10B are example illustrations of a number of messages during a service on demand session initiation in accordance with one example embodiment;

DETAILED DESCRIPTION OF EXAMPLE EMBODIMENTS

Overview

A method is provided and may include receiving a request for a network content delivery service from an access device. The term 'network content delivery service' includes any type of activity associated with video propagation in any type of network (e.g., adaptive bit rate protocols, streaming protocols, subscription models involving cable companies, video providers (e.g., Amazon™, Netflix™, etc.)). The network content delivery service can include any type of service (e.g., provided in the network or provided to the access device) being requested. The method also includes directing the access device to a network service provider (i.e., any entity involved in the network service) for authentication for the network content delivery service. 'Directing' in such a context can include, but is not limited to, routing packets, sending a message to the access device, coordinating or otherwise managing the session for the access device, etc. The method also includes receiving a network authorization token (e.g., any type of identifier, symbol, label, key, etc.) from the access device, where the network authorization token can be associated with the access device. The method can also include obtaining (e.g., receiving, identifying, looking up, etc.) a network access token from the network service provider and binding (e.g., associating, correlating, analyzing, etc.) the network access token to a content access token.

Example Embodiments

Figure 1:
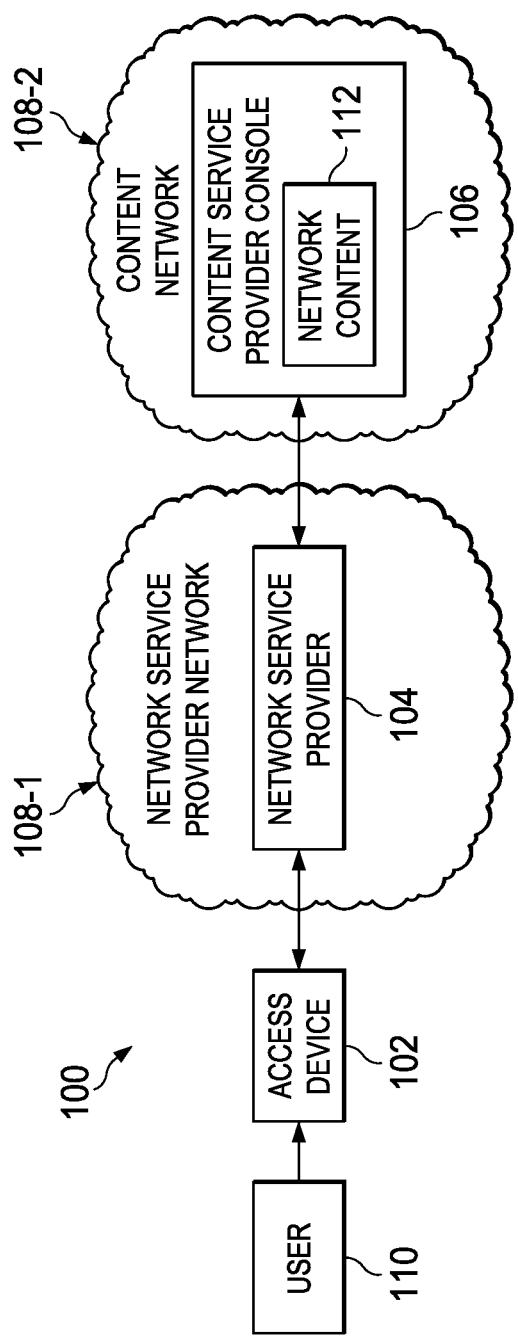
FIG. 1 is an example illustration of an implementation of content service on demand (CSoD) system in accordance with one example embodiment.

FIG. 1 is a simplified block diagram of an implementation of a content service on demand (CSoD) system in accordance with one example embodiment. As shown, CSoD system 100 includes an access device 102, a network service provider 104, and a content service provider console 106. Network service provider 104 can be associated with (i.e., located within) a network service provider network 108-1 and content service provider console 106 can be associated with (i.e., located within) a content network to be managed by any suitable entity (e.g., Hulu™, Netflix™, Cable Operators, Amazon™, etc.) that seeks to deliver and/or manage video delivery in any manner.

Access device 102 may be configured to facilitate access by a user 110 to network content 112 associated with (e.g., provided by) content service provider console 106. To this end, access device 102 may communicate with content service provider console 106 by way of network service provider network 108-1 and content network 108-2. Access device 102 may be implemented by any suitable access device, such as a mobile or wireless device (e.g., a mobile phone and/or a tablet computer), a personal computer, a set-top box device, a digital video recorder ("DVR") device, a personal-digital assistant device, a gaming device, a television device, and/or any other suitable computing device configured to access network content 112.

As used herein, "network content" refers to any data, service, or content (e.g., Internet content) that may be accessed by way of a network. For example, network content 112 may include, but is not limited to, a website, a network-based application (e.g., an application configured to be executed by a mobile device), a network-based service (e.g., an email service, a global positioning service ("GPS") service, a navigation service, etc.), gaming content, advertisement content (e.g., web-based advertisements, banner advertisements, pop-up advertisements, etc.), media content (e.g., video and/or audio content), and/or any other type of content accessible by way of a network as may serve a particular implementation.

As used herein, a "network service provider" may include any entity configured to provide one or more network access services (e.g., wireless data access services) to a user (e.g., a subscriber). For example, a network service provider may include, but is not limited to, a wireless carrier, a wireless network provider, an Internet network service provider, a subscriber television network service provider, and/or any other type of provider of network access services as may serve a particular implementation.

As used herein, a "content service provider" may include any entity or person associated with network content 112 other than a network service provider. For example, a content service provider may include, but is not limited to, a website owner, an application developer, an application provider, an advertisement provider, a media provider, an entity (i.e., a third party entity) other than the entity that actually provides and/or maintains network content 112, etc.

Network service provider network 108-1 may be configured to provide one or more network access services (e.g., wireless data access services) to access device 102. For example, network service provider 104 may be configured to manage (e.g., track, allow, disallow, route, etc.) network traffic (i.e., data) that flows through network service provider network 108-1. To this end, network service provider network 108-1 may be implemented by one or more gateways, routers, servers (e.g., DNS servers and/or billing management servers), and/or other network components as may serve a particular implementation. Network service provider 104 may also provide a differentiated quality of service (QoS). Differentiated QoS may include a guaranteed bit rate (GBR) bandwidth and non-GBR to access device 102. Adaptive bit rate (ABR) technology may be used to deliver network content 112. However, network service provider 104 may apply a QoS treatment to support a quality experience.

Content service provider console 106 may be associated with any suitable device and/or content network and may be configured to provide network content 112 that may be accessed by access device 102. Content network 108-2 may be implemented by any combination of computing devices (e.g., servers) as may serve a particular implementation. A user (e.g., subscriber) may access network content 112, such as video content, through content service provider console 106.

Access device 102, network service provider 104, and content service provider console 106 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, access device 102, network service provider 104, and content service provider console 106 may communicate by way of network service provider network 108-1 and content network 108-2. Network service provider network 108-1 may include any provider-specific network (e.g., a wireless carrier network or a mobile telephone network). Content network 108-2 may include a content service provider-specific network, the Internet, or any other suitable network associated with content service provider console 106. Data may flow between network service provider network 108-1 and content network 108-2 using any suitable communication technologies, devices, media, and protocols as may serve a particular implementation.

While two interconnected networks 108-1 and 108-2 (collectively "networks 108") are shown in FIG. 1, it will be recognized that networks 108-1 and 108-2 may be combined into a single network 108 in accordance with the methods and systems described herein. Likewise, it will be recognized that access device 102 may access network content 112 by way of more than two interconnected networks in accordance with the methods and systems described herein as may serve a particular implementation.

Figure 2:
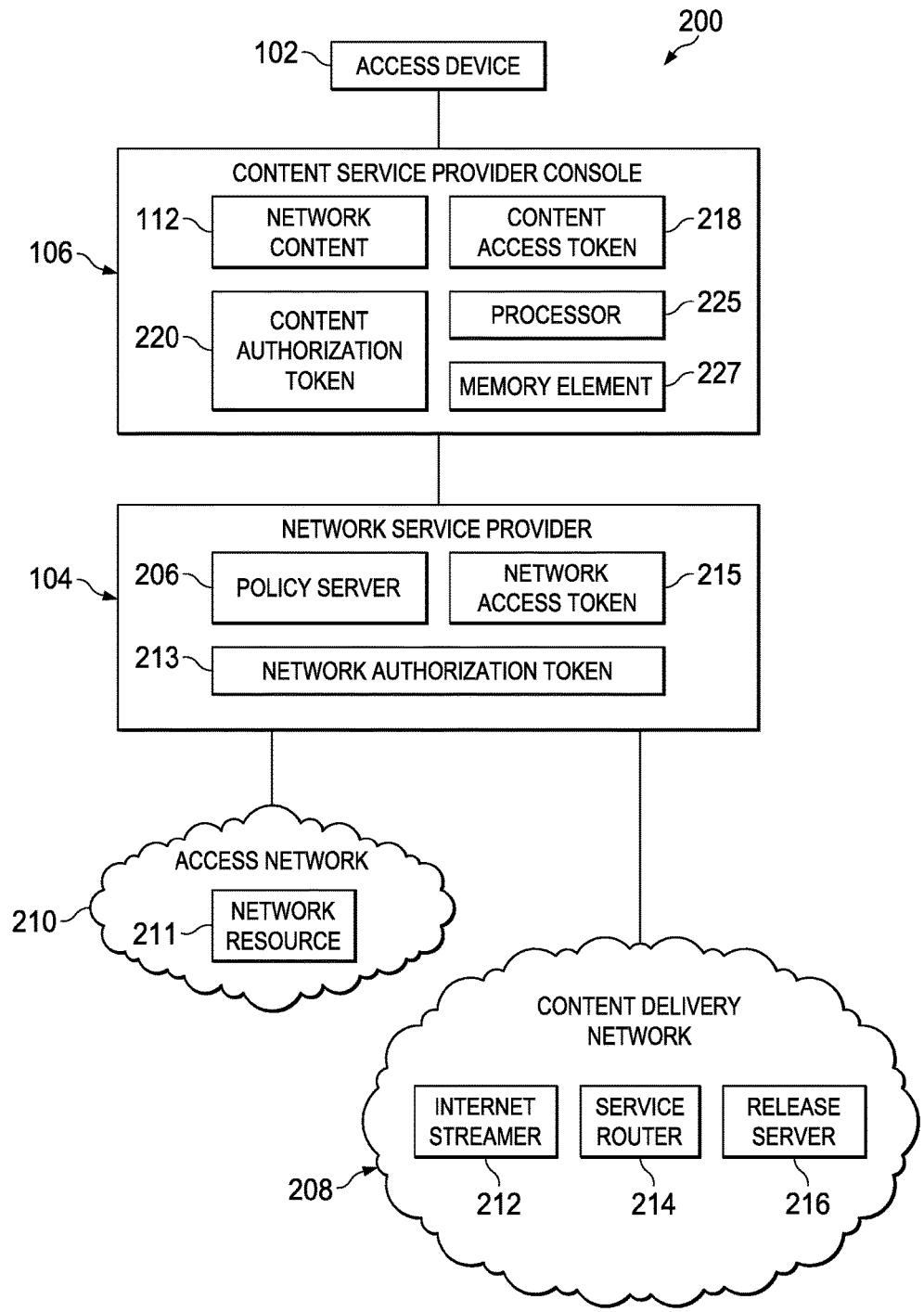
FIG. 2 is an example illustration of a network content service on demand architecture in accordance with one example embodiment.

FIG. 2 is a simplified illustration of a network content service on demand architecture in accordance with one example embodiment. Architecture 200 may include user 110, network service provider 104, and content service provider console 106, which may further include a processor 225 and a memory element 227. User 110 may use access device 102 to access to network service provider 104. Network service provider 104 may include a policy server 206, a content delivery network 208, at least one access network 210, a network resource 211, a network authorization token 213, and a network access token 215. Content delivery network 208 may include an Internet streamer 212, a service router 214, and a web server 216. Content service provider console 106 may include network content 112, a content access token 218, and a content authorization token 220.

User 110 (also referred to as an end user) has access to various access devices, such as access device 102, and may be able to access network content 112 hosted on the Internet through the use of access device 102. Network content 112 may be of varying qualities and may be delivered to multiple users over mobile and wired networks. Access device 102 may also be referred to as client devices and may include, but not limited to, TV/DVD devices, personal computers, tablets (iPads™, Surfaces™, etc.), laptops, smartphones (e.g., iPhones™, Google Droids™, etc.), Ultrabooks™, etc.

Content service provider console 106 may provide network content 112 to user 110 and other users through access devices. An example of a content service provider may be, but not limited to, an application service provider, which may provide applications to access devices. Another example may be a movie streaming service, which may provide movies to access devices. The CSoD architecture depicts the cloud-based services provided by content service provider console 106, network service provider 104 with one or more access networks, and user 110 with multiple types of devices that have both wired and wireless connectivity.

Content service provider console 106 may use access and authorization tokens along with network service provider 104 to grant access to network content 112 and network resource 211. Content service provider console 106 may be configured to generate content access token 218 and content authorization token 220.

An access or authorization token may grant access to an object, file, resource, login session, etc. to the holder of the access or authorization token. Content access token 218 may grant access to network content 112. Content authorization token 220 may provide the credentials for obtaining content access token 218. In an embodiment, only content authorization token 220 and network authorization token 213 may be exposed to access device 102. In one or more embodiments, network access token 215 and content access token 218 may not be exposed to access device 102. However, it other embodiments, it may be possible for any configuration of tokens to be exposed to access device 102. Additionally, in one or more embodiments, network access token 215 may be bound to content access token 218. In an embodiment, binding may be a logical association between the tokens. Binding may be implemented by encapsulating one token within another token or by a protocol semantics for associating two fields in a message or any other way to logically associate the two tokens carrying the information needed for authorizing resources. In other embodiments, tokens may be bound together by including one token within another token, or one token may contain another token. In further embodiments, tokens may be bound in other ways, such as, for example, referencing each other.

Network service provider 104 may be configured to generate network authorization token 213 and network access token 215. Theses tokens may also be referred to as channel authorization token and channel access token, respectively. These tokens may also be referred to as device authorization token and device access token, respectively. Network authorization token 213 provide the credentials for obtaining network access token 215. Network access token 215 may grant access to network resource 211.

Content service provider console 106 may pay network service provider 104 for delivering network content 112, with a better QoS, to user 110. In turn, network service provider 104 may pay content service provider console 106 for providing network content 112.

Network service provider 104 may include content delivery network (CDN) 208 and access network 210. Access network 210 may be part of a telecommunications network that connects access device 102 of user 110 (i.e., subscriber) to network service provider 104. Access network 210 may include and be able to allocate a network resource 211. One example of network resource 211 may be, but not limited to, bandwidth. For example, access network 210 may allocate a guaranteed amount of bandwidth for delivery of network content 112.

Content delivery network 208 may be a large distributed system of servers deployed in multiple data centers in the Internet. An objective of CDN 208 is to serve content to user 110 with high availability and high performance. CDNs currently serve a large fraction of the Internet content, including web objects (text, graphics, URLs and scripts), downloadable objects (media files, software, documents), applications (e-commerce, portals), live streaming media, on-demand streaming media, and social networks.

CDN 208 may include Internet streamer 212, service router 214, and web server 216. Internet streamer 212 may handle network content 112 streaming and download to access device 102 of user 110. Service router 214 may mediate requests from access device 102. Service router 214 may select an Internet streamer based on location and load conditions. Web server 216 may control uniform resource locators (URLs) for delivery of network content 112. In an embodiment, CDN 208 may provide numerous benefits for cacheable content: reduced delivery cost, improved quality of experience for user 110, and increased robustness of delivery.

One or more embodiments of this disclosure provides for collaboration between content service provider console 106 and network service provider 104 using a content service on demand (e.g., video service on demand (VSOD)). This arrangement allows a single service provider to participate as both a content service provider and a network service provider. This arrangement allows a content service provider to reach its subscribers via other network service providers without having to build out more access network infrastructure. In addition, the network service providers can serve other content service providers and leverage its own access network to monetize this established resource.

An embodiment of this disclosure enables Internet-level scalability for resource sharing (i.e., NSP's network and CSP's content). The revenue from user 110 may be shared between content service provider console 106 and network service provider 104 as the service providers collaborate to satisfy the demands of the customer that wants access to unlimited content with premium delivery User 110 may have the availability of applications and content at the Internet level (i.e. not limited to SP's wall garden), reachable over many media (e.g. cable, Wi-Fi, 3G/4G) with quality delivery, and enjoying the high-resolution possible on different access devices.

One or more embodiments of this disclosure may provide dynamic authentication, authorization and service level agreement exchange between service providers (e.g., using Open Authorization). The embodiments may also provide for policy linkage between a network resource (e.g., bandwidth) and a content resource (e.g., network content 112) by use of simple Internet technologies rather than elaborate policy server peering infrastructure. Additionally, the embodiments may provide quality of service (QoS) enforcement for the OTT data path at a session level, avoiding scalability issues with flow level.

An example embodiment may be a service for OTT Video on Demand with quality delivery. User 110 may browse the Internet and encounters video content that user 110 wants to watch from content service provider console 106. User 110 may choose the VSoD service provided by network service provider 104 for quality delivery. After authorization by network service provider 104, user 110 may play the video with access device 102. Network service provider 104 may provide sufficient bandwidth at a steady rate to achieve high quality viewing experience.

In one or more embodiments of this disclosure, network service provider 104 and application service providers/content service provider console 106 have business relationships and set up the SoD APIs based on industry standard, open authorization (OAuth). In different embodiments, other authorization standards may be used alone or in combination with OAuth (e.g., OpenID). This resource sharing technology is scalable for the Internet-wide services and readily available in commercial web services.

In one or more embodiments of this disclosure, CSoD APIs may be used to validate the consumption of resources (e.g. bandwidth of network service provider 104 and video content of content service provider console 106). The identifiers used to obtain resources can be logged for billing purpose. In one or more embodiments of this disclosure, the OAuth technique is enhanced to link network service provider 104 and application service providers/content service provider console 106 resources to ensure quality delivery for data path of application/video content. In one or more embodiments of this disclosure, content delivery network 208 delivers network content 112 at the traffic rate of a particular ABR profile quality level (to replicate a constant bit rate as used in current network service provider channels). The packets, which make up network content 112, are marked for preferential treatment. The session for delivering network content 112 is maintained based on the network access token. The session may consist of multiple transmission control protocol (TCP) sessions and remains constant even when the TCP session changes, Internet streamer 212 switches over, network content 112 changes, etc. If access device 102 conditions dictate use of a lower ABR profile (e.g. due to CPU constraints), the access device 102 can lower the ABR profile.

In one or more embodiments of this disclosure, access network 210 (e.g. Data Over Cable Service Interface Specification (DOCSIS), LTE) has a bearer for the aggregate bandwidth (flow filters may not be needed). The downstream packets are associated with the right bearer based on the IP address and differentiated services code point (DSCP) marking. Differentiated services may be a computer networking architecture that specifies a simple, scalable and coarse-grained mechanism for classifying and managing network traffic and providing quality of service (QoS) on modern IP networks. DSCP can, for example, be used to provide low-latency to critical network traffic such as voice or streaming media while providing simple best-effort service to non-critical services such as web traffic or file transfers.

Network service provider 104 and content service provider console 106 may use Internet Engineering Task Force (IETF) standard protocols to share and link resources (e.g., bandwidth, devices, network content). Network service provider 104 and content service provider console 106 may also use access tokens associated with access device 102 for billing purposes.

One or more embodiments of this disclosure may recognize and take into account that adaptive bit rate technology can adjust the data stream profile of network content 112 to available bandwidth, however the resulting video quality may be less than desired. This is challenging for the network service provider to maintain the growth in terms of the cost and complexity to obtain the content rights and to build up infrastructure for storing and maintaining the content. However, the network service provider can provide high quality delivery for network content 112 that is available to its users. The quality of experience is excellent in this case for the user. But it's not the same experience when the user is watching video that is available on the Internet or otherwise delivered as OTT content. The viewing experience may be poor because the following can happen during the period: buffering, pixelation, pauses, and resolution degradation.

One or more embodiments of this disclosure may recognize and take into account that there is also a lack of a framework to provide service level agreements and enforcements for network content 112, such as, for example, video services, across network service providers. For example, many users may desire to view their online TV show while travelling, but are unable to do so, since there is no capability in the network today to authorize, exchange agreements, and dynamically set policy enforcements along the path. Currently, the "theoretical" solution for such problems has been based on policy server peering with an application function (e.g. video server) to facilitate the installation of the policies in the visited (access) network. While policy servers have seen some deployments within existing access networks (incl. mobile), policy server peering has failed to generate traction. Reasons for this include overall complexity, need for policy server infrastructure in both networks, and reliance on a common standardized yet extensive policy server peering architecture and associated protocol(s), e.g. as defined by 3GPP (TS 23.203, 29.215 etc.). One or more embodiments of this disclosure may address the issues by combining the availability of OTT content with delivery quality of the network service provider to achieve the most desirable combination while relying on simple and adopted standards that are currently in wide use on the Internet. These embodiments may also open up new business models, which now allow network service providers to tap into a large ecosystem of services, and add value to the services.

The OAuth implementation is highly scalable and well suited for the open level of interoperability between Internet services. Using this technique leverages the built-in security. Though it is used for delegated service authorization, the idea to link the NSP's and CSP's resources enables a model where coupled resources can be used for authorization and billing to differentiate their roles in the service delivery to the subscriber. The binding allows the policy to be associated appropriately. There may be content-related policy such as locations that are restricted from delivery. There may be network-related policy such as subscriber's bandwidth limitation. The policies associated with the resources are passed along during the resource acquisition procedure.

The delivery of the content is using available features such as traffic pacing and DSCP marking. There may be some additional logic to set the right rate to maintain a steady rate for ABR traffic. By putting everything together with a few enhancements, the solution enables the end user to choose content right off the Internet and "stick it" into the "right pipe". The end user does not need to be a subscriber of every access network that delivers the content. The business and technical relationships are set up between the NSPs and CSPs.

VSoD CDN is aware of the content that is delivered to the end user. Since it's aware of the bandwidth resource needed by the content, there's no need for flow filters in the network (e.g. because the access network is provisioned with a certain amount of bandwidth for the user's VSOD traffic, which is DSCP-marked by the CDN). This reduces the amount of states and signaling load in the network. Even when the flow endpoint changes, the enforcement in the network remains the same as it is still for the same amount of GBR bandwidth or better QoS for non-GBR bandwidth.

Figure 3:
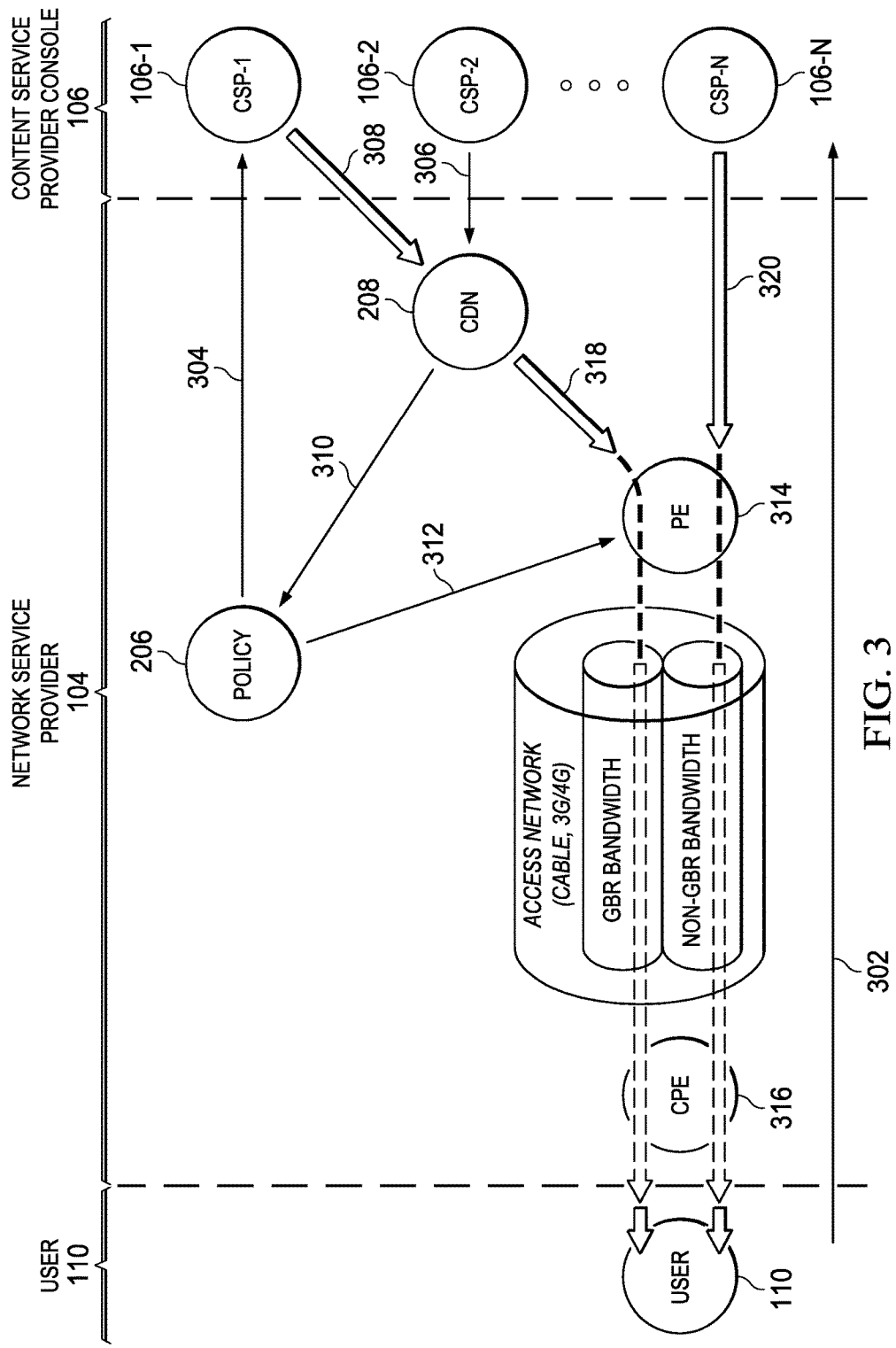
FIG. 3 is an example illustration of a content service on demand (CSoD) flow overview in accordance with one example embodiment.

FIG. 3 is a simplified illustration of a content service on demand (CSoD) flow overview in accordance with one example embodiment. Overview 300 may include a user 110, network service provider 104, and content service provider console 106. Content service provider console 106 may include multiple content service providers 106-1 . . . 106-N that participate in CSoD with network service provider 104. Network service provider 104 and content service provider console 106 may establish APIs for communicating with each other.

In message 302, user 110 may enable the CSoD service provided by network service provider 104. In message 304, policy server 206 of network service provider 104 may issue network access token to content service provider console 106 for access to network resources. In message 303, user 110 may select network content to access. User 110 may perform these actions through an access device. In message, 306, content service provider console 106 may issue a content access token to content delivery network 208 for access to the network content. In traffic flow 308, content delivery network 208 may use the access token to obtain the network content. In message 310, content delivery network 208 may communicate with policy server 206 to trigger provisioning of access network 210 with the network resource.

In message 312, policy server 206 may provision access network 210 with the network resource. For example, in one embodiment, policy server 206 may provision access network 210 with GBR bandwidth for network content traffic (i.e., CSoD traffic for user 110). In provisioning access network 210, policy server 206 may provision a provider edge router (PE) 314. PE router 314 is an access network router between a network service provider and the users/devices served by the provider. The network content may flow through access network 210 and reach a customer premise equipment (CPE) 316. CPE 316 is a router located on the premises of user 110 that provides an Ethernet interface between the local area network of user 110 and a core network of network service provider 104.

In traffic flow 318, content delivery network 208 may provide network content to user 110 through PE 314, access network 210, and CPE 316. Traffic flow 318 may be marked for GBR bandwidth in the uplink and downlink directions. In traffic flow 320, content service provider console 106 may communicate with user 110 through PE 314, access network 210, and CPE 316. Traffic flow 320 may not be marked GBR bandwidth in the uplink and downlink directions.

Figure 4:
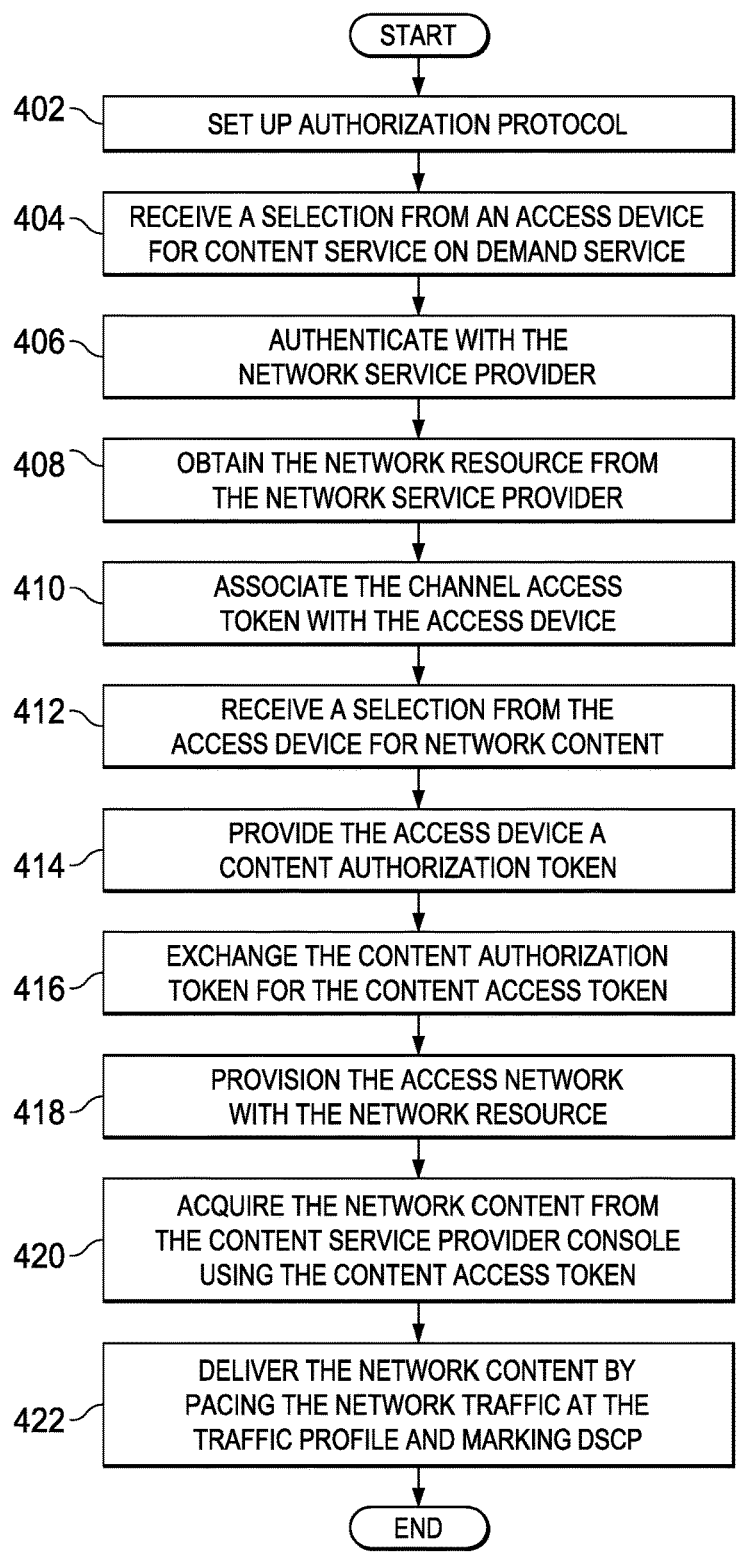
FIG. 4 is a simplified flowchart illustrating method for providing network content in accordance with one example embodiment.

FIG. 4 is a simplified flowchart illustrating method for providing network content in accordance with one example embodiment. A flow 400 may begin at step 402, network service provider and content service providers set up an authorization protocol. For example, they may set up OAuth APIs. The OAuth APIs enable the service providers to share and authorize network resources and content resources. The network resources may be, for example, bandwidth. The content resources may be, for example, video content, gaming content, application content, or any other type of network content.

At step 404, a content service provider receives a selection from an access device for CSoD service. A network service provider may provide the CSoD service. The content service provider may redirect the access device to a website of the network service provider for CSoD authorization. At step 406, the access device authenticates with the network service provider. Here, the network service provider authorizes CSoD service to be used for watching network content from the content service provider. The network service provider provides the access device a network authorization token for the network resource (e.g., bandwidth). The network authorization token may be a one-time use token. The network service provider may direct the access device back to the content service provider after authorization.

At step 408, the content service provider obtains the network resource authorization from the network service provider. In this step, the content service provider may exchange the network authorization token with an access token for network resource from network service provider. The token exchange may use an authorization standard, such as, for example, OAuth. At step 410, the content service provider associates the network access token with the access device. In different embodiments, the access token may be associated with the network resource (i.e., channel).

At step 412, a content service provider receives a selection from an access device for network content. At 414, the content service provider provides the access device a content authorization token for the network content. The content authorization token may be a one-time use token. The content service provider may redirect the access device to a content delivery network of the network service provider. At step 416, an Internet streamer in the content delivery network contacts the content service provider and exchanges the content authorization token for a content access token. The token exchange may use an authorization standard, such as, for example, OAuth. The content access token may also be bound with the network access token (from step 408), a content profile, as well as a content acquisition and delivery policy (e.g. location restriction) of the content service provider. The content profile may contain information about the content, such as, for example, the bit rate and content metadata. Content metadata may include, for example, the genre of the content, cast of a video content, rating, and other suitable metadata. Based on the received information (tokens, content profiles, policies, etc.), the network service provider may identify that the network content should be delivered at a specific rate using the authorized network resource for the access device. In other words, the network content is bound to the network resource.

At step 418, the network service provider provisions the access network with the network resource (e.g., the bandwidth needed for content delivery). Content classification in the access network may be based on the IP address or TCP/UDP port of the access device (i.e., accounting for network address translations as well as multiple and changing packet flows for the network content). Provisioning may involve mapping traffic to a specific bearer (e.g., an evolved packet switched system (EPS) bearer for long term evolution (LTE) technology). A particular DSCP may be dedicated to the CSoD service and rely on the CDN to mark all "quality-enabled" traffic with the correct DSCP. At step 420, the Internet streamer acquires the network content from the content service provider using the content access token. At step 422, the Internet streamer delivers the network content by pacing network traffic at the traffic profile and marking DSCP. The access network enforces the data path based on the DSCP marking (i.e., no signaling to access network for additional flows or when flows change). For billing purpose, the network service provider may provide the content access token associated with the network access token to the content service provider (and vice versa) to prove that content used premium delivery.

Figure 5:
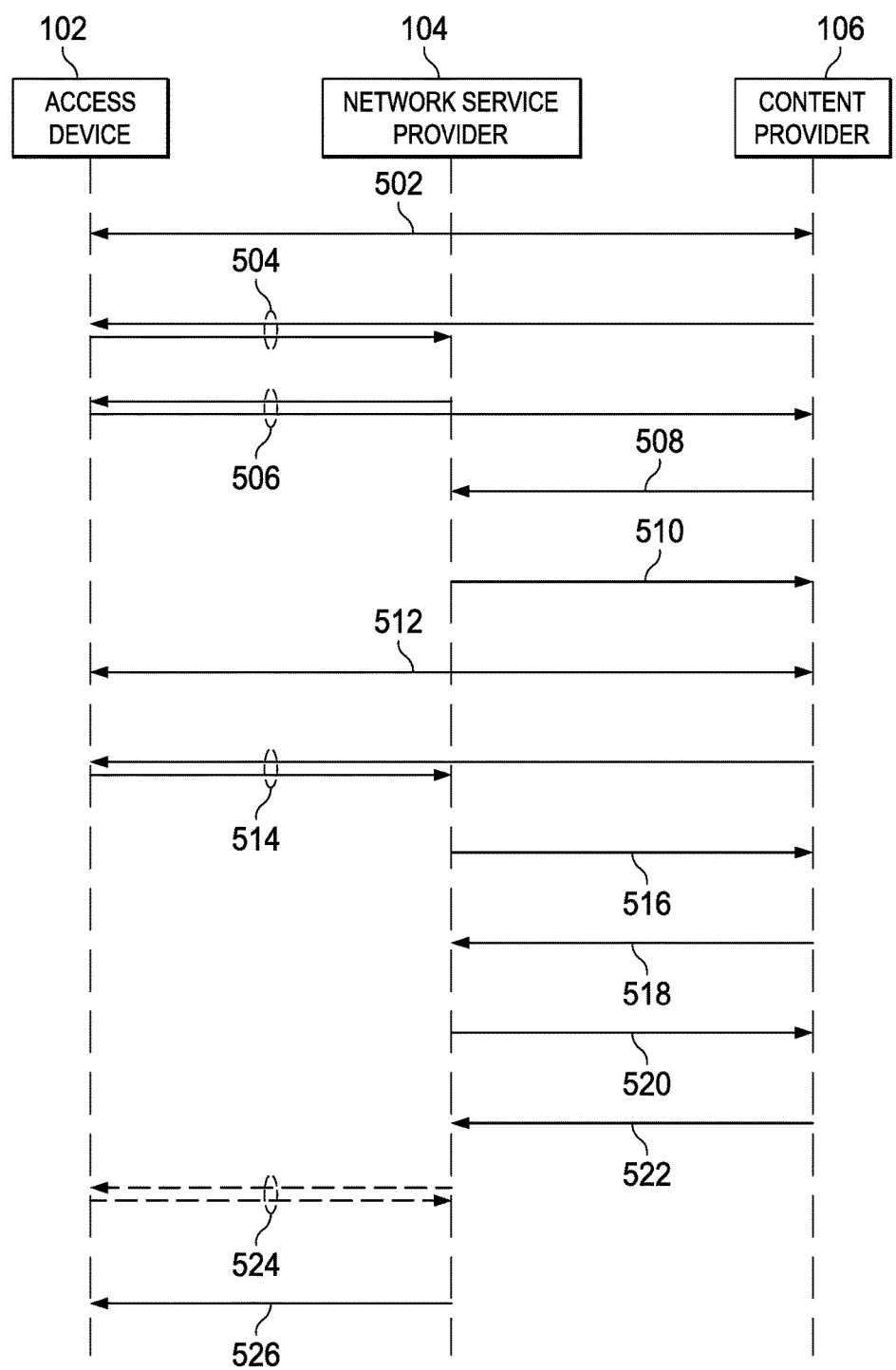
FIG. 5 is an example illustration of a number of messages between a user device, network service provider, and content service provider in accordance with one example embodiment.

FIG. 5 is a simplified illustration of a number of messages between a user device, network service provider, and content service provider in accordance with one example embodiment. Access device 102 may be connected to network service provider 104 and a content service provider console 106, similarly as in FIG. 1. In message 502, access device 102 may navigate a portal for content network service provider 104 through, for example, the Internet, and select service on demand. In response to the selection, in message 504, content service provider console 106 redirects access device 102 to network service provider 104 for authentication and authorization.

Network service provider 104 may authenticate access device 102 and authorize the service on demand, assigns a channel (bandwidth) selected by access device 102, and generates a network authorization token. The channel may be, for example, a high definition channel, standard definition channel, or some other suitable type of channel. In message 506, network service provider 104 redirects access device 102 to content service provider console 106 with the network authorization token for the selected channel.

In message 508, content service provider console 106 may request a network access token using the network authorization token. In message 510, network service provider 104 may provide the network access token for the selected channel. In message 512, access device 102 may navigate a portal of content service provider console 106 and select network content to receive through the selected channel. Content service provider console 106 may generate a content authorization token linked to the network access token, thereby combining the resources. Therefore, using the network content may require the selected channel. In message 514, content service provider console 106 may redirect access device 102 to network service provider 104 with the content authorization token for the network content. In message 516, network service provider 104 may request a content access token using the content authorization token.

In message 518, content service provider console 106 may provide the content access token for the network content. The content access token may also be bound to the network access token to access the selected channel. Network service provider 104 may validate the network access token, obtained from the content access token, to allow use of the selected channel. In message 520, network service provider 104 may request the network content using the content access token. Content service provider console 106 may validate the content access token to allow delivery of the network content. In message 522, content service provider console 106 delivers the network content to network service provider 104. If the network content is already in a cache of network service provider 104, then network service provider 104 only checks to see if that the network content is not stale and messages 520 and 522 may not occur.

Network service provider 104 may associate the selected channel, referenced by the network access token, with the network content. Network service provider 104 may also set the delivery rate for the selected channel in a content delivery network and provision the bandwidth for the selected channel in an access network. In message 524, network service provider 104 may redirect access device 102 to the cache with the network content. In message 526, network service provider 104 may deliver the network content at the selected rate with a trusted differentiated services code point marking on guaranteed bit rate bandwidth reserved for access device 102.

Additionally, if access device 102 uses network service provider 104 to access a second network content using a second content service provider on a second channel, then access device 102 may go through the same steps as shown in this FIGURE again, but with the second content service provider and a second channel. If access device 102 uses a second content service provider but the same channel to access a second network content, then access device 102 may go through the same steps as shown in FIG. 5 again, but with a second content service provider.

Figure 6:
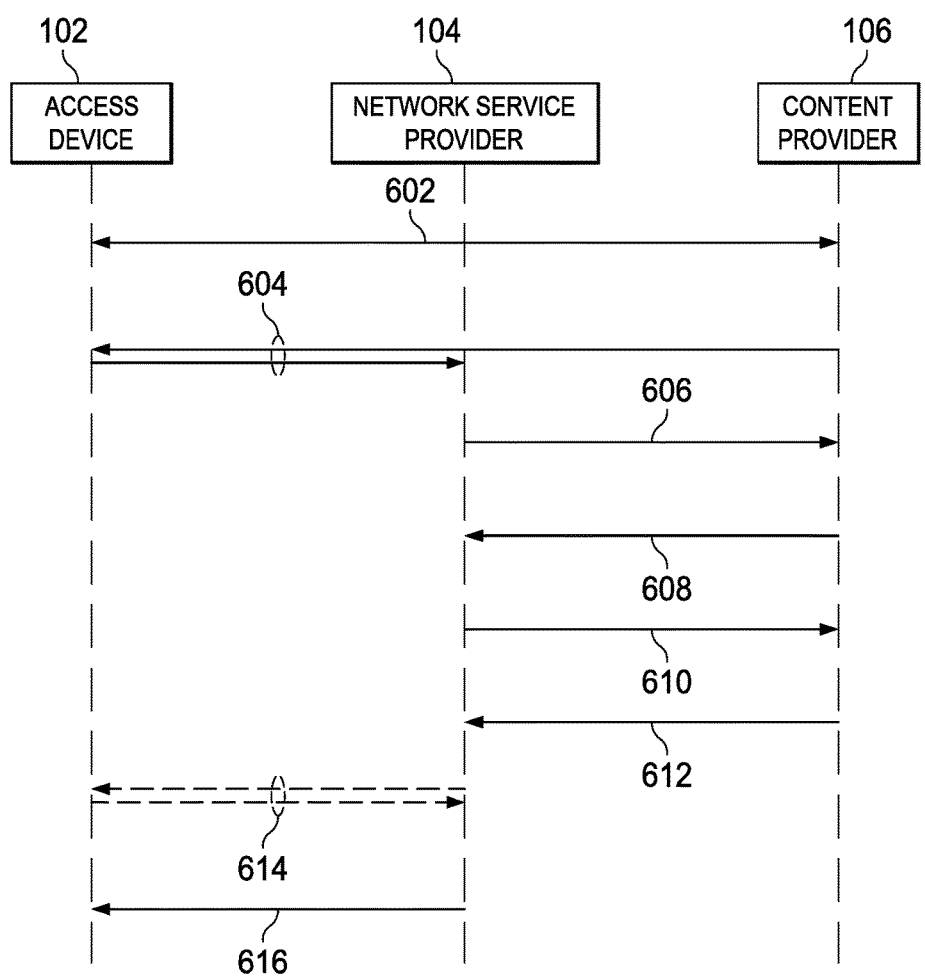
FIG. 6 is an example illustration of a number of messages for new content on a selected channel between a user device, network service provider, and content service provider in accordance with one example embodiment.

FIG. 6 is a simplified illustration of a number of messages for new content on the selected channel between a user device, network service provider, and content service provider in accordance with one example embodiment. Access device 102 may be connected to network service provider 104 and a content service provider console 106, similarly as in FIG. 1. In FIG. 6, access device 102 may have already accessed network content through network service provider 104 and content service provider console 106, and is attempting to access a second network content from content service provider console 106.

In message 602, access device 102 may navigate a portal of content service provider console 106 and select a second network content to receive through the selected channel. Content service provider console 106 may generate a second content authorization token linked to the network access token, thereby combining the resources. Therefore, using the network content may require the selected channel. In message 604, content service provider console 106 may redirect access device 102 to network service provider 104 with the second content authorization token for the second network content. In message 606, network service provider 104 may request a second content access token using the second content authorization token.

In message 608, content service provider console 106 may provide the second content access token for the second network content. The second content access token may also be bound to the network access token to access the selected channel. Network service provider 104 may validate the network access token, obtained from the second content access token, to allow use of the selected channel. In message 610, network service provider 104 may request the second network content using the second content access token. Content service provider console 106 may validate the second content access token to allow delivery of the second network content. In message 612, content service provider console 106 delivers the second network content to network service provider 104. If the second network content is already in a cache of network service provider 104, then network service provider 104 only checks to see if that the second network content is not stale and messages 610 and 612 may not occur.

Network service provider 104 may associate the selected channel, referenced by the network access token, with the second network content. Network service provider 104 may also set the delivery rate for the selected channel in a content delivery network and provision the bandwidth for the selected channel in an access network. In message 614, network service provider 104 may redirect access device 102 to the cache with the second network content. In message 616, network service provider 104 may deliver the second network content at the selected rate with a trusted differentiated services code point marking on guaranteed bit rate bandwidth reserved for access device 102.

Figure 7:
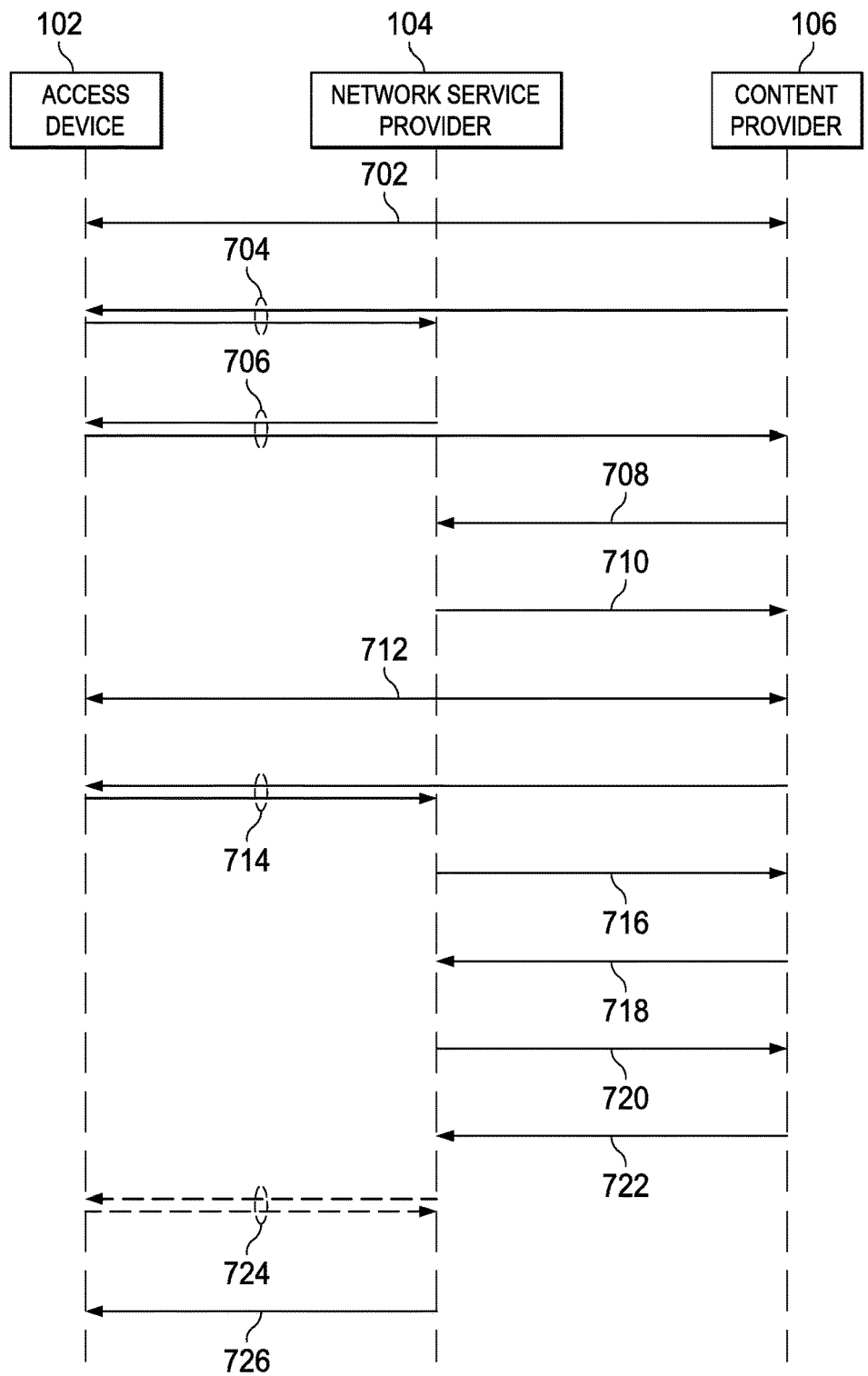
FIG. 7 is an example illustration of a number of messages between a user device, network service provider, and content service provider in accordance with one example embodiment.

FIG. 7 is a simplified illustration of a number of messages between a user device, network service provider, and content service provider in accordance with one example embodiment. Access device 102 may be connected to network service provider 104 and a content service provider console 106, similarly as in FIG. 1. In message 702, access device 102 may navigate a portal for content network service provider 104 through, for example, the Internet, and select service on demand. In response to the selection, in message 704, content service provider console 106 redirects access device 102 to network service provider 104 for authentication and authorization.

Network service provider 104 may authenticate access device 102 and authorize the service on demand, assigns a channel selected by access device 102, and generates a network authorization token. The channel may be, for example, a high definition channel, standard definition channel, or some other suitable type of channel. In message 706, network service provider 104 redirects access device 102 to content service provider console 106 with the network authorization token for the selected channel. In message 708, content service provider console 106 may request a network access token using the network authorization token. In message 710, network service provider 104 may provide the network access token for the selected channel. In message 712, access device 102 may navigate a portal of content service provider console 106 and select network content to receive through the selected channel. Content service provider console 106 may generate a content authorization token linked to the network access token, thereby combining the resources. Therefore, using the network content may require the selected channel.

In message 714, content service provider console 106 may redirect access device 102 to network service provider 104 with the content authorization token for the network content. In message 716, network service provider 104 may request a content access token using the content authorization token. In message 718, content service provider console 106 may provide the content access token for the network content. The content access token may also contain the network access token to access the selected channel. Network service provider 104 may validate the network access token, obtained from the content access token, to allow use of the selected channel.

In message 720, network service provider 104 may request the network content using the content access token. Content service provider console 106 may validate the content access token to allow delivery of the network content. In message 722, content service provider console 106 delivers the network content to network service provider 104. If the network content is already in a cache of network service provider 104, then network service provider 104 only checks to see if that the network content is not stale and messages 720 and 722 may not occur. Network service provider 104 may associate the selected channel, referenced by the network access token, with the network content. Network service provider 104 may also set the delivery rate for the selected channel in a content delivery network and provision the bandwidth for the selected channel in an access network. In message 724, network service provider 104 may redirect access device 102 to the cache with the network content. In message 726, network service provider 104 may deliver the network content at the selected rate with a trusted differentiated services code point marking on guaranteed bit rate bandwidth reserved for access device 102.

Figure 8:
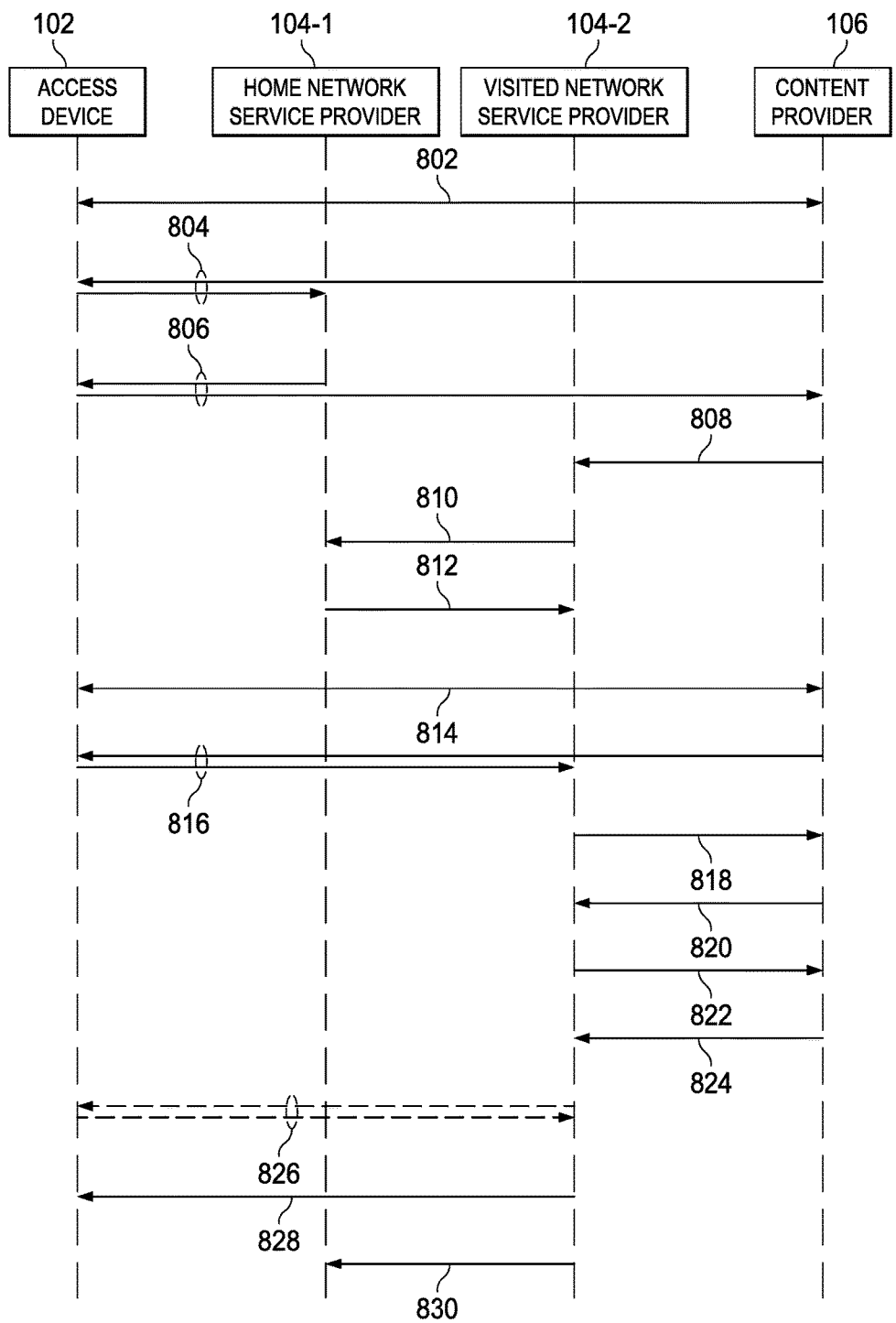
FIG. 8 is an example illustration of a number of messages between a user device, home network service provider, visited network service provider, and content service provider in accordance with one example embodiment.

FIG. 8 is a simplified illustration of a number of messages between a user device, home network service provider, visited network service provider, and content service provider in accordance with one example embodiment. Access device 102 may be connected to home network service provider 104-1, visited network service provider 104-2, and a content service provider console 106, similarly as in FIG. 1 except home network service provider 104-1 and visited network service provider 104-2 may be shown together as network service provider 104. Home network service provider 104-1 and visited network service provider 104-2 may be different administrative domains.

In message 802, access device 102 may navigate a portal for content network service provider 104 through, for example, the Internet, and select content service on demand. In response to the selection, in message 804, content service provider console 106 redirects access device 102 to network service provider 104 for authentication and authorization.

Network service provider 104 may authenticate access device 102 and authorize the service on demand, assigns a channel selected by access device 102, and generates a network authorization token. The channel may be, for example, a high definition channel, standard definition channel, or some other suitable type of channel. In message 806, network service provider 104 redirects access device 102 to content service provider console 106 with the network authorization token for the selected channel.

In message 808, content service provider console 106 may request a network access token from visited network service provider 104-2 using the network authorization token. In message 810, visited network service provider 104-2 may request the network access token from home network service provider 104-1 using the network authorization token. In message 812, network service provider 104 may provide the network access token to visited network service provider 104-2 for the selected channel. Visited network service provider 104-2 may authorize the service on demand, assign a channel selected by access device 102, and generates a network authorization token linked to the network authorization token.

In message 814, access device 102 may navigate a portal of content service provider console 106 and select network content to receive through the selected channel. Content service provider console 106 may generate a content authorization token linked to the network access token, thereby combining the resources. Therefore, using the network content may require the selected channel. In message 816, content service provider console 106 may redirect access device 102 to visited network service provider 104-2 with the content authorization token for the network content. In message 818, visited network service provider 104-2 may request a content access token using the content authorization token.

In message 820, content service provider console 106 may provide the content access token for the network content to visited network service provider 104-2. The content access token may also contain the network access token to access the selected channel. Network service provider 104 may validate the network access token, obtained from the content access token, to allow use of the selected channel.

In message 822, visited network service provider 104-2 may request the network content using the content access token. Content service provider console 106 may validate the content access token to allow delivery of the network content. In message 824, content service provider console 106 delivers the network content to visited network service provider 104-2. If the network content is already in a cache of visited network service provider 104-2, then visited network service provider 104-2 may only check to see if that the network content is not stale and messages 822 and 824 may not occur.

Visited network service provider 104-2 may associate the selected channel, referenced by the network access token, with the network content. Visited network service provider 104-2 may also set the delivery rate for the selected channel in a content delivery network and provision the bandwidth for the selected channel in an access network. In message 826, visited network service provider 104-2 may redirect access device 102 to the cache with the network content. In message 828, visited network service provider 104-2 may deliver the network content at the selected rate with a trusted differentiated services code point marking on guaranteed bit rate bandwidth reserved for access device 102.

In message 830, visited network service provider 104-2 may report delivery of the network content associated with the network access token. In message 832, home network service provider 104-1 may associate the selected channel, referenced by the network access token, with the network content. Home network service provider 104-1 may not use an access network resource. However, the information of the selected channel the network content may be used for billing a user associated with access device 102.

Figure 9:
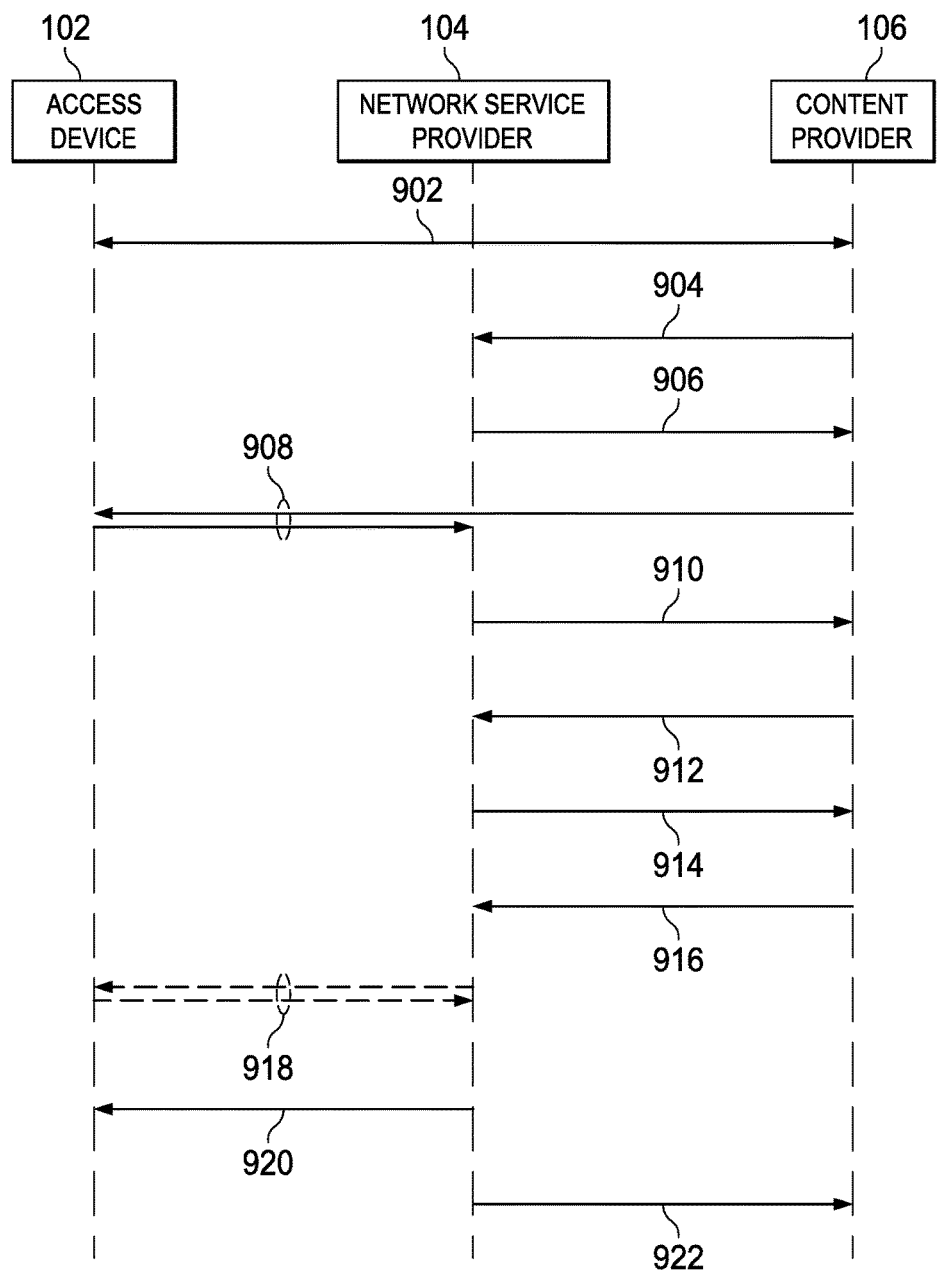
FIG. 9 is an example illustration of a number of messages for new content on a selected channel between a user device, network service provider, and content service provider in accordance with one example embodiment.

FIG. 9 is a simplified illustration of a number of messages for new content on the selected channel between a user device, network service provider, and content service provider in accordance with one example embodiment. Access device 102 may be connected to network service provider 104 and a content service provider console 106, similarly as in FIG. 1. In this FIGURE, access device 102 may only have a subscription to network content on content service provider console 106.

In message 902, access device 102 may navigate a portal of content service provider console 106 and select network content to receive through service on demand. Content service provider console 106 may determine network service provider based on an Internet Protocol address of access device 102. In message 904, content service provider console 106 may request a network access token from network service provider 104. Network service provider 104 may authorize service on demand, assign a selected channel to access device 102, and generate a network access token. In message 906, network service provider 104 may provide the network access token for the selected channel to content service provider console 106.

Content service provider console 106 may generate a content authorization token linked to the network access token, thereby combining the resources. Therefore, using the network content may require the selected channel. In message 908, content service provider console 106 may redirect access device 102 to network service provider 104 with the content authorization token for the network content. In message 910, network service provider 104 may request a content access token from content service provider console 106 using the second content authorization token. In message 912, content service provider console 106 may provide the content access token for the network content. The content access token may also contain the network access token to access the selected channel. Network service provider 104 may validate the network access token, obtained from the second content access token, to allow use of the selected channel.

In message 914, network service provider 104 may request the network content using the content access token. Content service provider console 106 may validate the content access token to allow delivery of the network content. In message 916, content service provider console 106 delivers the network content to network service provider 104. If the network content is already in a cache of network service provider 104, then network service provider 104 only checks to see if that the network content is not stale and messages 914 and 916 may not occur.

Network service provider 104 may associate the selected channel, referenced by the network access token, with the network content. Network service provider 104 may also set the delivery rate for the selected channel in a content delivery network and provision the bandwidth for the selected channel in an access network. In message 918, network service provider 104 may redirect access device 102 to the cache with the network content. In message 920, network service provider 104 may deliver the network content at the selected rate with a trusted differentiated services code point marking on guaranteed bit rate bandwidth reserved for access device 102. In message 922, network service provider 104 may report delivery of the network content associated with the content access token to content service provider console 106.

Figure 10A:
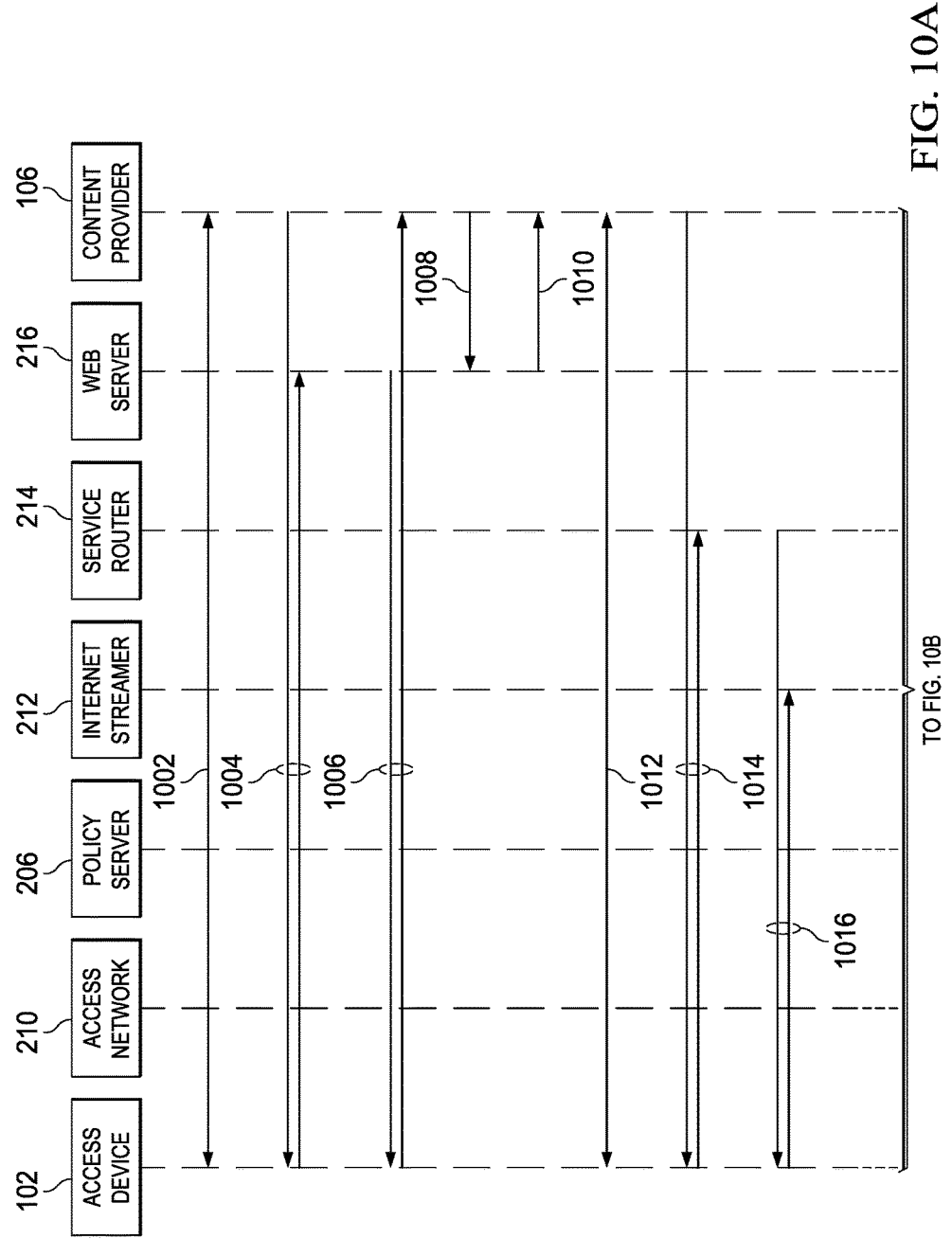

FIGS. 10A and 10B are simplified illustrations of a number of messages during a service on demand session initiation in accordance with one example embodiment. Access device 102 may be connected to access network 210, policy server 206, Internet streamer 212, service router 214, web server 216, and content service provider console 106. In message 1002, access device 102 may navigate a portal for content network service provider 104 through, for example, the Internet, and select service on demand. In response to the selection, in message 1004, content service provider console 106 redirects access device 102 to web server 216 for authentication and authorization. An application-programming interface (API) of a network service provider may be invoked for service on demand authorization.

Web server 216 may authenticate access device 102 and authorize the service on demand, assigns a channel selected by access device 102, and generates a network authorization token associated with access device 102. In message 1006, web server 216 redirects access device 102 to content service provider console 106 with the network authorization token. In message 1008, content service provider console 106 may request a network access token using the network authorization token. In message 1010, web server 216 may provide the network access token. The API of a network service provider may be invoked for service on demand authorization. The network access token may be associated with the bandwidth needed for access device 102. Messages 1002-1010 may only occur when access device 102 accesses a content service provider for the first time.

In message 1012, access device 102 may navigate a portal of content service provider console 106 and select network content to receive on access device 102. Content service provider console 106 may generate a content authorization token linked to the network access token, thereby combining the resources. In message 1014, content service provider console 106 may redirect access device 102 to service router 214 with the content authorization token for the network content. In message 1016, service router 214 may redirect access device 102 to Internet streamer 212 for network content delivery with the content authorization token.

In message 1018, Internet streamer 212 may request a content access token using the content authorization token. In message 1020, content service provider console 106 may provide the content access token for the network content. The content access token may also contain the network access token to access the bandwidth for access device 102. The API of a network service provider may be invoked for service on demand authorization. In messages 1018-1020, the content authorization token may be used as the content access token, but the network access token may not be desirable to expose to a user of access device 102.

In message 1022, Internet streamer 212 may request validation of the network access token, obtained from the content access token, from web server 216. Web server 216 may validate the network access token, obtained from the content access token, to allow use of the bandwidth for access device 102 for network content delivery by Internet streamer 212. In message 1024, web server 216 may confirm the network access token is valid. In message 1026, Internet streamer 212 may request the network content using the content access token. Content service provider console 106 may validate the content access token to allow delivery of the network content. In message 1028, content service provider console 106 delivers the network content to Internet streamer 212. If the network content is already in a cache of Internet streamer 212, then Internet streamer 212 only checks to see if that the network content is not stale and messages 1026 and 1028 may not occur.

In message 1030, web server 216 may request the bandwidth allocation for access device 102 from policy server 206. Policy server 206 checks the bandwidth availability. In message 1032, policy server 206 may allocate the bandwidth for access device 102 in access network 210. Access network 210 may provide bandwidth for access device 102 and set up a telecommunications service, such as a bearer service. In message 1034, access network 210 may acknowledge the bandwidth allocation to policy server 206. In message 1036, policy server 206 may acknowledge the bandwidth allocation to web server 216. Messages 1030-1036 may only occur if the bandwidth for access device 102 is not already in use.

In message 1038, Internet streamer 212 may deliver the network content at an adaptive bit rate profile rate with appropriate differentiated services code point marking (DSCP). The network content may be delivered at, for example, a high definition or standard definition, obtained from the content access token, with trusted DSCP marking on guaranteed bit rate bandwidth reserved for access device 102.

Figure 11:
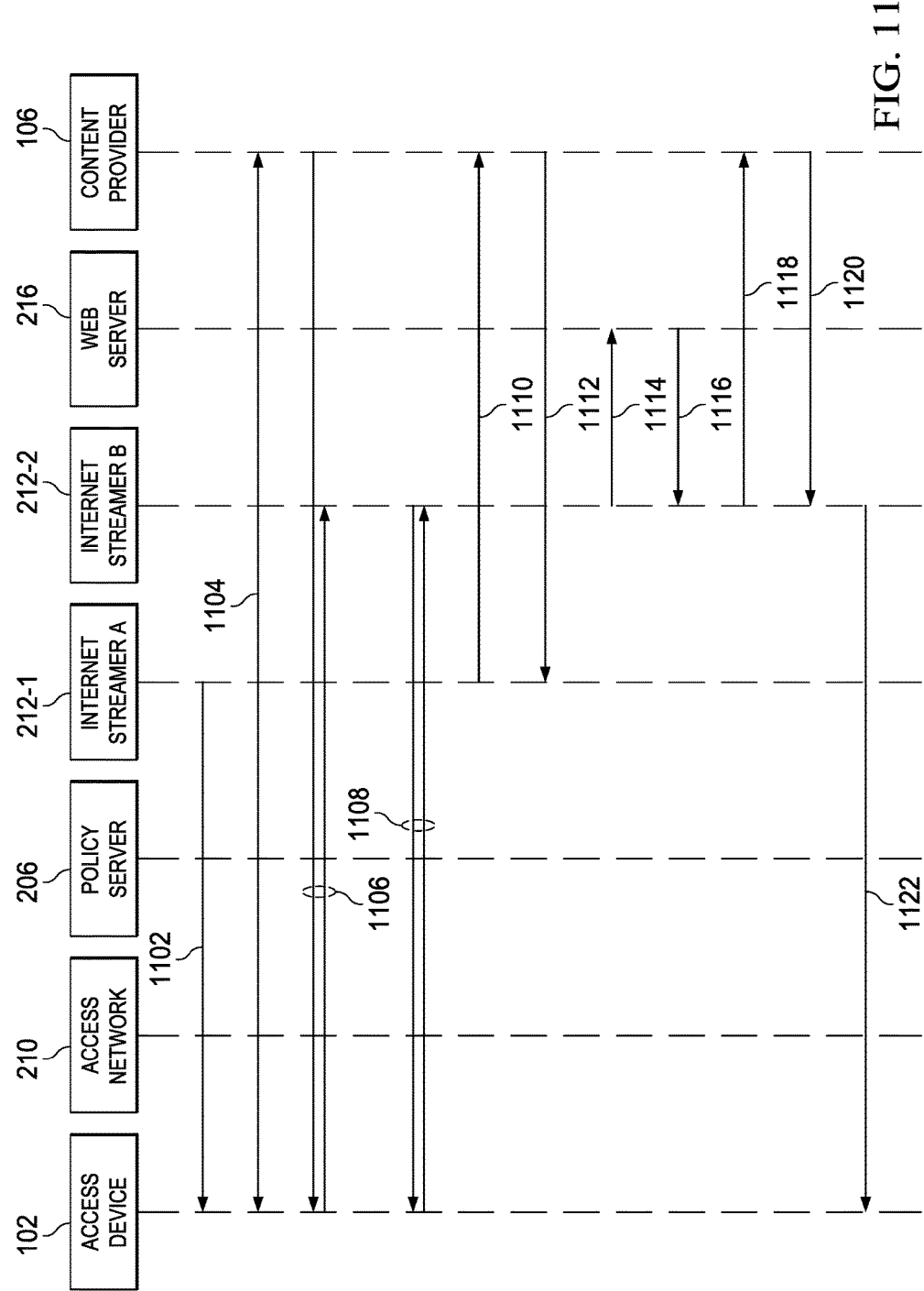
FIG. 11 is an example illustration of a number of messages during a service on demand session Internet streamer switchover in accordance with one example embodiment.

FIG. 11 is a simplified illustration of a number of messages during a service on demand session Internet streamer switchover in accordance with one example embodiment. Access device 102 may be connected to access network 210, policy server 206, Internet streamer 212-1, Internet streamer 212-2, web server 216, and content service provider console 106. In message 1102, Internet streamer 212-1 may deliver network content at an adaptive bit rate profile rate with appropriate DSCP marking. At some point during delivery, Internet streamer 212-1 may be unable to deliver further network content. In message 1104, access device 102 may navigate a portal of content service provider console 106 and select network content to receive on access device 102. The network access token may have been persevered during the network content delivery session. Content service provider console 106 may generate another content authorization token linked to the network access token, thereby combining the resources. In message 1106, content service provider console 106 may redirect access device 102 to service router 214 with the content authorization token for the network content. In message 1108, service router 214 may redirect access device 102 to Internet streamer 212-2 for network content delivery with the content authorization token.

In message 1110, Internet streamer 212-2 may request a content access token using the content authorization token. In message 1112, content service provider console 106 may provide the content access token for the network content. The content access token may also contain the network access token to access the bandwidth for access device 102. In messages 1110-1112, the content authorization token may be used as the content access token, but the network access token may not be desirable to expose to a user of access device 102.

In message 1114, Internet streamer 212-2 may request validation of the network access token, obtained from the content access token, from web server 216. Web server 216 may validate the network access token, obtained from the content access token, to allow use of the bandwidth for access device 102 for network content delivery by Internet streamer 212-2. In message 1116, web server 216 may confirm the network access token is valid.

In message 1118, Internet streamer 212-2 may request the network content using the content access token. Content service provider console 106 may validate the content access token to allow delivery of the network content. In message 1120, content service provider console 106 delivers the network content to Internet streamer 212-2. If the network content is already in a cache of Internet streamer 212, then Internet streamer 212 only checks to see if that the network content is not stale and messages 1118 and 1120 may not occur. In message 1122, Internet streamer 212-2 may deliver the network content at an adaptive bit rate profile rate with appropriate differentiated services code point marking (DSCP).

Figure 12:
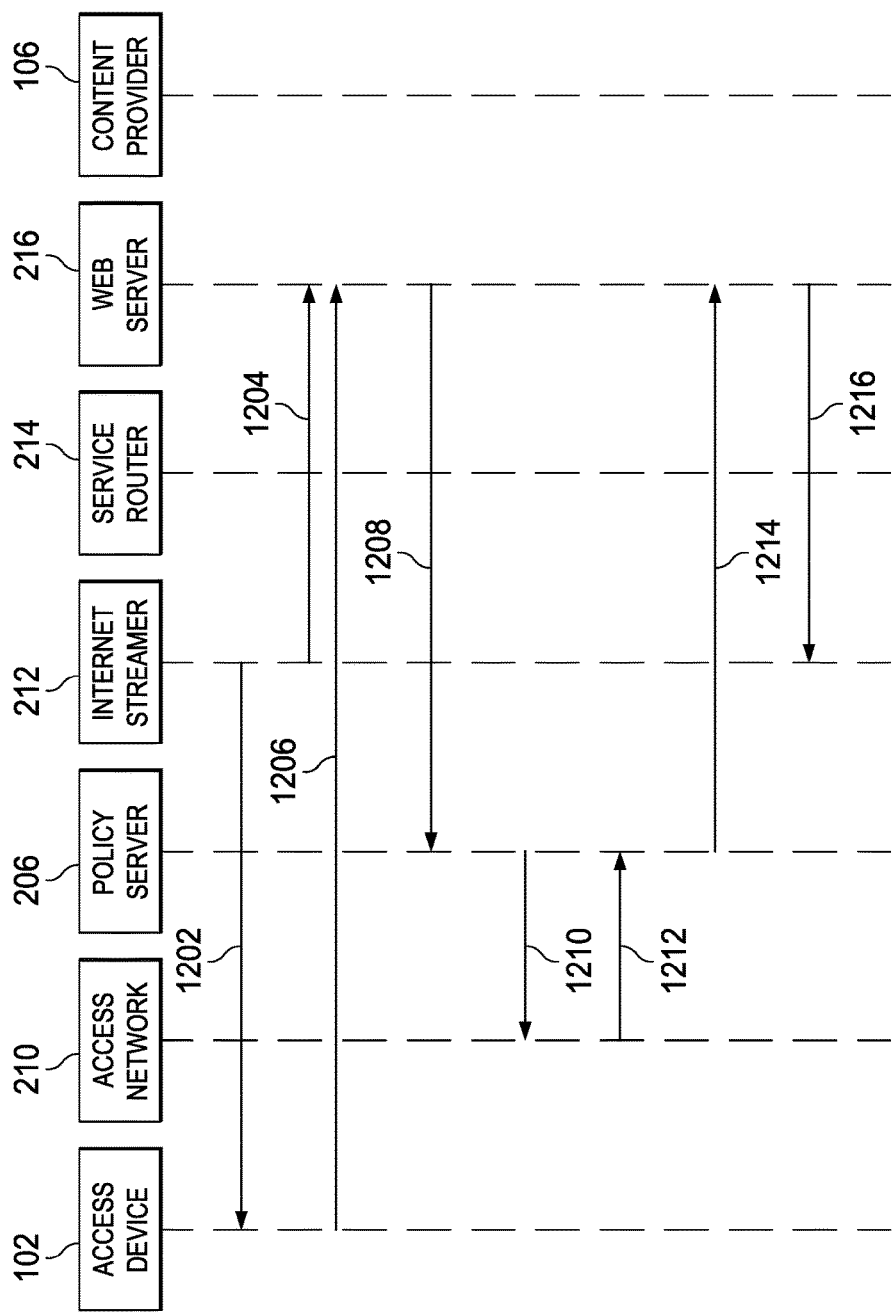
FIG. 12 is an example illustration of a number of messages during a service on demand session termination in accordance with one example embodiment.

FIG. 12 is a simplified illustration of a number of messages during a service on demand session termination in accordance with one example embodiment. Access device 102 may be connected to access network 210, policy server 206, Internet streamer 212, service router 214, web server 216, and content service provider console 106. In message 1202, Internet streamer 212 may have delivery of network content stopped to access device 102. The network content may be stopped by access device 102, inactivity of the delivery session, a timer, an event, or some other suitable reason. In message 1204, Internet streamer 212 may indicate to web server 216 that the delivery session using the network access token has been terminated. In message 1206, access device 102 may indicate to web server 216 that the delivery session using the network access token has been terminated. In message 1208, web server 216 may check whether a lifetime of the network access token has expired. Messages 1204-1208 may or may not occur in any combination of just one, two, or all three. Messages 1204-1208 may also occur in any order.

Web server 216 validates the network access token and identifies that the network access token can be associated with access device 102. In message 1212, web server 216 may release the bandwidth allocated for access device 102. Then, policy server 206 may release the bandwidth. In message 1214, policy server 206 indicates to access network 210 to release the bandwidth for access device 102 in access network 210. In response, access network 210 may release the bandwidth for access device 102.

In message 1216, access network 210 may acknowledge the bandwidth release to policy server 206. In message 1218, policy server 206 may acknowledge the release of bandwidth to web server 216. In message 1220, web server 216 may confirm the bandwidth release associated with the network access token to Internet streamer 212.

In regards to the internal structure associated with CSoD system 100, in one particular embodiment, content service provider console 106 is a network element that can facilitate the video management activities discussed herein. As used herein in this Specification, the term 'network element' is meant to encompass any of the aforementioned elements, as well as routers, switches, cable boxes, set-top boxes of any kind, gateways, bridges, load balancers, firewalls, inline service nodes, proxies, servers, processors, modules, or any other suitable device (e.g., handheld devices such as tablets, smartphones, etc.), component, element, proprietary appliance, or object operable to exchange information in a network environment. Any of the network elements of FIG. 1 may include any suitable hardware, software, components, modules, interfaces, or objects that facilitate the operations thereof. This may be inclusive of appropriate algorithms and communication protocols that allow for the effective exchange of data or information.

Additionally, it should be noted that each of content service provider console 106, network service provider 104, access network 210, policy server 206, content delivery network 208, and access device 102 can include memory elements for storing information to be used in the operations outlined herein. Each of content service provider console 106, network service provider 104, access network 210, policy server 206, content delivery network 208, and access device 102 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, or in any other suitable component, device, element, or object where appropriate and based on particular needs. Any of the memory items discussed herein should be construed as being encompassed within the broad term 'memory element.' The information being used, tracked, sent, or received by content service provider console 106, network service provider 104, access network 210, policy server 206, content delivery network 208, and access device 102 could be provided in any database, register, queue, table, cache, control list, or other storage structure, all of which can be referenced at any suitable timeframe. Any such storage options may be included within the broad term 'memory element' as used herein.

In certain embodiments, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory media. In some of these instances, memory elements can store data used for the operations described herein. This includes the memory elements being able to store software, logic, code, or processor instructions that are executed to carry out the activities described herein.

In one embodiment, content service provider console 106, network service provider 104, access network 210, policy server 206, content delivery network 208, and access device 102 may include software modules to achieve, or to foster, operations as outlined herein. In other embodiments, such operations may be carried out by hardware, implemented externally to these elements, or included in some other network device to achieve the intended functionality. Alternatively, these elements may include software (or reciprocating software) that can coordinate in order to achieve the operations, as outlined herein. In still other embodiments, one or all of these devices may include any suitable algorithms, hardware, software, components, modules, interfaces, or objects that facilitate the operations thereof.

Additionally, each of use content service provider console 106, network service provider 104, access network 210, policy server 206, content delivery network 208, and access device 102 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   authorizing a service on demand, based on a reception of a message from an access device;
   providing a network authorization token to the access device, the network authorization token associated with a bandwidth;
   receiving a network access token in exchange for the network authorization token from a content service provider;
   transmitting a content authorization token to the content service provider, the content authorization token received from the content service provider in response to a request for accessing network content from the access device;
   receiving a content access token from the content service provider in exchange for the content authorization token, the content access token being bound with the network access token;
   provisioning the bandwidth for the access device;

acquiring the network content from the content service provider based on the content access token; and delivering the network content at an adaptive bit rate to the access device on the provisioned bandwidth.

2. The method of claim 1, further comprising:

obtaining the network access token from the content access token; and validating the network access token.

3. The method of claim 1, further comprising:

checking the bandwidth availability for the access device.

4. The method of claim 1, wherein delivering the network content comprises delivering the network content with differentiated services code point marking (DSCP).

5. The method of claim 1, further comprising:

redirecting the access device for network content delivery with the content authorization token.

6. The method of claim 1, further comprising:

receiving an indication that a delivery session using the network access token has been terminated; and indicating a release of the bandwidth for the access device.

7. The method of claim 6, further comprising:

receiving an acknowledgement of the release of the bandwidth; and confirming a bandwidth release associated with the network access token.

8. A non-transitory computer readable medium that stores a set of instructions which when executed perform a method comprising:

authorizing a service on demand, based on a reception of a message from an access device;

providing a network authorization token to the access device, the network authorization token associated with a bandwidth;

receiving a network access token in exchange for the network authorization token from a content service provider;

transmitting a content authorization token to the content service provider, the content authorization token received from the content service provider in response to a request for accessing network content from the access device;

receiving a content access token from the content service provider in exchange for the content authorization token, the content access token being bound with the network access token;

provisioning the bandwidth for the access device;

acquiring the network content from the content service provider based on the content access token; and delivering the network content at an adaptive bit rate to the access device on the provisioned bandwidth.

9. The non-transitory computer readable medium of claim 8, the method further comprising:

obtaining the network access token from the content access token; and validating the network access token.

10. The non-transitory computer readable medium of claim 8, the method further comprising:

checking the bandwidth availability for the access device.

11. The non-transitory computer readable medium of claim 8, the method further comprising:

delivering the network content with differentiated services code point marking (DSCP).

12. The non-transitory computer readable medium of claim 8, the method further comprising:

redirecting the access device for network content delivery with the content authorization token.

13. The non-transitory computer readable medium of claim 8, the method further comprising:

receiving an indication that the delivery session using the network access token has been terminated; and indicating a release of the bandwidth for the access device.

14. The non-transitory computer readable medium of claim 13, the method further comprising:

receiving an acknowledgement of the release of the bandwidth; and confirming a bandwidth release associated with the network access token.

15. An apparatus comprising:

a memory storage; and a processing unit coupled to the memory storage, wherein the processing unit is operative to:

authorize a service on demand, based on a reception of a message from an access device, provide a network authorization token to the access device, the network authorization token being associated with a bandwidth, receive a network access token in exchange for the network authorization token from a content service provider transmit a content authorization token to the content service provider, the content authorization token received from the content service provider in response to a request for accessing network content from the access device, receive a content access token from the content service provider in exchange for the content authorization token, the content access token being bound with the network access token, provisioning the bandwidth for the access device;

acquire the network content from the content service provider based on the content access token; and deliver the network content at an adaptive bit rate to the access device on the provisioned bandwidth.

16. The apparatus of claim 15, wherein the processor is operative to receive the network access token from the content access token and validate the network access token.

17. The apparatus of claim 15, wherein the processor is further operative to check the bandwidth availability for the access device.

18. The apparatus of claim 15, wherein the processor is further operative to deliver the network content with differentiated services code point marking (DSCP).

19. The apparatus of claim 15, further comprising:

a service router configured to redirect the access device for network content delivery with the content authorization token.

20. The apparatus of claim 15, further comprising:

a policy server configured to indicate a release of bandwidth for the access device, wherein the web server is further configured to receive an indication that the delivery session using the network access token has been terminated, to receive an acknowledgement of the release of the bandwidth, and to confirm a bandwidth release associated with the network access token.

* * * * *